United States Patent
Anderson

[11] 3,911,043
[45] *Oct. 7, 1975

[54] PLURAL STAGES OF HF ALKYLATION OF ISOPARAFFIN WITH A MONO-OLEFIN

[75] Inventor: Robert F. Anderson, LaGrange Park, Ill.

[73] Assignee: Universal Oil Products Company, Des Plaines, Ill.

[ * ] Notice: The portion of the term of this patent subsequent to Nov. 5, 1991, has been disclaimed.

[22] Filed: Mar. 27, 1974

[21] Appl. No.: 455,178

Related U.S. Application Data

[63] Continuation-in-part of Ser. No. 291,137, Sept. 21, 1972, Pat. No. 3,830,865, which is a continuation-in-part of Ser. No. 236,049, March 20, 1972, Pat. No. 3,787,518.

[52] U.S. Cl.................... 260/683.45; 260/683.48
[51] Int. Cl.$^2$.......................................... C07C 3/54
[58] Field of Search...... 260/683.45, 683.48, 683.49

[56] References Cited
UNITED STATES PATENTS

| | | | |
|---|---|---|---|
| 2,820,073 | 1/1958 | Dixon et al. | 260/683.45 |
| 3,211,803 | 10/1965 | Chapman | 260/683.49 |
| 3,515,770 | 6/1970 | Tregilgas | 260/683.48 |
| 3,780,131 | 12/1973 | Sobel | 260/683.48 |
| 3,787,518 | 1/1974 | Anderson | 260/683.45 |
| 3,846,505 | 11/1974 | Anderson | 260/683.45 |

Primary Examiner—Delbert E. Gantz
Assistant Examiner—G. J. Crasanakis
Attorney, Agent, or Firm—James R. Hoatson, Jr.; Thomas K. McBride; William H. Page, II

[57] ABSTRACT

A process for alkylating isobutane with a $C_3$–$C_5$ mono-olefin which includes admixing a first portion of the $C_3$–$C_5$ olefin with the isobutane and contacting the resulting first hydrocarbon mixture with a first hydrogen fluoride catalyst phase in a first alkylation zone to form a first alkylation reaction mixture; removing the first alkylation reaction mixture from the alkylation zone, settling the first alkylation reaction mixture to provide a first settled hydrocarbons phase and the first hydrogen fluoride catalyst phase and recycling the first hydrogen fluoride catalyst phase to the first alkylation reaction zone; admixing a second portion of the $C_3$–$C_5$ olefin with the first settled hydrocarbon phase and contacting the resulting second hydrocarbon mixture with a second hydrogen fluoride catalyst phase in a second alkylation reaction zone to form a second alkylation reaction mixture; removing the second alkylation reaction mixture from the second alkylation reaction zone, settling the second alkylation reaction mixture to provide a second settled hydrocarbons phase and the second hydrogen fluoride catalyst phase, and recycling the second hydrogen fluoride catalyst phase to the second alkylation reaction zone; fractionating the second settled hydrocarbons phase to provide a product stream and an isobutane stream, recycling the isobutane stream to the first alkylation reaction zone, and recovering the alkylate product from the product stream.

4 Claims, 1 Drawing Figure

U.S. Patent   Oct. 7, 1975   3,911,043
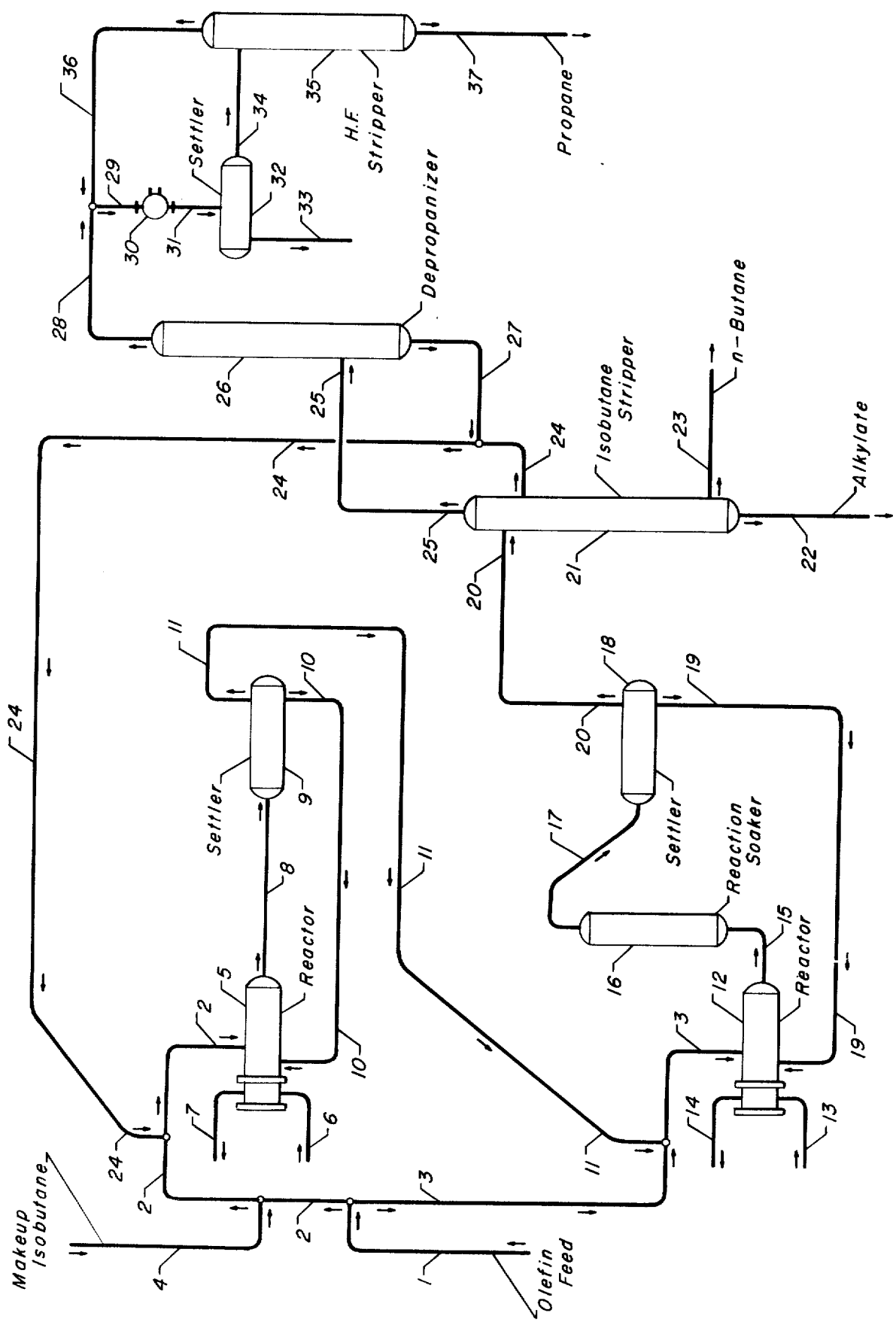

PLURAL STAGES OF HF ALKYLATION OF ISOPARAFFIN WITH A MONO-OLEFIN

CROSS-REFERENCE TO RELATED APPLICATIONS

This application is a continuation-in-part of my copending application Ser. No. 291,137, filed on Sept. 21, 1972, now U.S. Pat. No. 3,830,865 Aug. 20, 1974 which is, in turn, a continuation-in-part of my copending application Ser. No. 236,049, filed on Mar. 20, 1972, now U.S. Pat. No. 3,787,518, Jan. 22, 1974, all the teachings of both of said copending applications being incorporated herein by reference.

BACKGROUND OF THE INVENTION

This invention relates to a process for producing an alkylation reaction product from isobutane and a $C_3$–$C_5$ olefin using hydrogen fluoride alkylation catalyst. This invention also relates to an improved alkylation process for providing hydrocarbon motor fuel components.

Alkylation of isoparaffinic hydrocarbons such as isobutane, isopentane and the like, with olefinic hydrocarbons such as propylene, butylenes, amylenes, and with olefin-acting compounds such as $C_3$–$C_5$ alkyl halides, using hydrogen fluoride as a catalyst, is well known as a commercially important method for producing gasoline boiling range hydrocarbons. The $C_5$–$C_{10}$ hydrocarbons normally produced by the isoparaffin-olefin alkylation reaction are termed "alkylate." Alkylate is particularly useful as a motor fuel blending stock because of its high motor and research octane ratings. It can be used to improve the overall octane rating of gasoline pools to comply with the requirements of modern automobile motors. High octane alkylate fuel components are particularly important in producing motor fuel of sufficient quality when it is desired not to employ alkyl lead compounds in the motor fuel to meet octane requirements. A continuing goal in the alkylation art is to provide a hydrogen fluoride catalyzed alkylation process more economical than conventional alkylation processes and capable of providing an alkylate product having motor and research octane ratings higher than is possible using conventional processes.

Generally, commercial isoparaffin-olefin alkylation processes employ isobutane as the isoparaffin reactant and utilize propylene, butylenes, amylenes, or mixtures thereof, as the olefin-acting agent. The isobutane and olefin are typically contacted with hydrogen fluoride catalyst in an alkylation reactor and mixed to form an emulsion or alkylation reaction mixture. After the alkylation reaction between the isobutane and olefin is substantially complete, the reaction mixture of hydrocarbons and catalyst is withdrawn from the reactor and settled in order to separate immiscible hydrocarbon and catalyst phases. The hydrogen fluoride catalyst phase thus separated is recycled to the reactor for further catalytic use. The hydrocarbon phase produced by the settling operation is further processed, normally by fractionation, to recover the alkylate product and to separate unconsumed isobutane for further use in the alkylation reactor by recycling from the fractionation step.

It has been found necessary to maintain the reactor temperature, relative amounts of catalyst and hydrocarbons charged, catalyst strength, and other processing conditions within narrow ranges in order to provide a high quality alkylate product. A molar ratio of isobutane to olefin in the hydrocarbon feed to the alkylation reactor of about 10:1 or more is one condition essential to the production of high octane alkylate in hydrogen fluoride catalyzed alkylation. The molar ratio of isobutane to olefin in the hydrocarbon feed to an alkylation reactor is conventionally termed the "external" isobutane/olefin mole ratio. The external isobutane/olefin mole ratio is to be differentiated from the molar ratio of isobutane to olefin in the alkylation reaction mixture formed within the alkylation reactor, which is conventionally termed the "internal" isoparaffin/olefin mole ratio. In alkylation processes using hydrogen fluoride catalyst, the quality of the alkylate product is substantially improved by increasing the external isobutane/olefin mole ratio but is not improved by increasing the internal isobutane/olefin mole ratio. That is, only the ratio of isobutane to olefin in the hydrocarbon feed to the alkylation reactor is important in providing a high octane product in hydrogen fluoride operations, not the concentration of isobutane in the reaction mixture within the alkylation reactor. The opposite is true in sulfuric acid alkylation, wherein the quality of the alkylate product is improved by an increased internal isobutane/olefin mole ratio, i.e., a higher concentration of isobutane in the reaction mixture within the alkylation reactor. In hydrogen fluoride catalyzed alkylation processes, it has been found desirable to employ as high an isobutane/olefin mole ratio as is economically possible in the hydrocarbon feed to the reactor, since the quality of the alkylate product is thereby improved. This improvement is exemplified by the increased octane rating of the alkylate product when a higher external isobutane/olefin mole ratio is utilized. Thus, in conventional operations a very considerable amount of isobutane is necessarily passed unreacted through the reactor and must be recycled to the reactor after fractionation of the hydrocarbon phase produced in the settler. This fractionation of the settled hydrocarbon phase is performed to separate the excess, unreacted isobutane from the higher boiling alkylate product. Large amounts of isobutane must accordingly be passed, unreacted, through an alkylation reactor and settler and separated from the alkylate product by fractionation in a conventional hydrogen fluoride alkylation operation. This required fractionation step necessitates the use of fractionation equipment of large capacity with high energy consumption in order to vaporize the isobutane to separate it from the heavier alkylate. Prior art has attempted to alleviate the problem caused by the large isobutane requirement by, for example, circulating an emulsion (alkylation reaction mixture) of hydrogen fluoride catalyst, isobutane and reaction products continuously through the alkylation reactor in an attempt to utilize the isobutane contained in the reaction mixture to provide a portion of the excess isobutane needed. This method of increasing the isobutane/olefin mole ratio had been found useful in sulfuric acid catalyzed alkylation processes, since the quality of the alkylate product is increased, in sulfuric acid operations, when the internal isobutane/olefin mole ratio is increased by raising the isoparaffin concentration in the reaction mixture within the alkylation reaction. In this early type of hydrogen fluoride alkylation operation, emulsion was withdrawn from an alkylation reactor and charged back into the reactor again along with fresh olefin and fresh and recycled isoparaffin. A modification of the emulsion circulation system was effected by passing the reaction mixture emulsion of hydrogen fluoride catalyst, isoparaffin and reaction products from a first alkylation zone into a second alkylation zone, where the emulsion was contacted with a fresh olefinic feed and further alkylation occurred. These early attempts to provide a high internal isoparaffin/olefin mole ratio in the alkylation reactor by processing schemes analogous to those used in sulfuric acid alkylation failed to provide any increase in the quality of the alkylate product in hydrogen fluoride catalyzed processes, and have generally been abandoned in commercial operations. It has been found that the quality of the alkylate product in hydrogen fluoride catalyzed alkylation is improved only when the external isobutane/olefin mole ratio is increased, and that the quality of the product is not improved by increasing the internal isobutane/olefin mole ratio. The conditions necessary for successful operation of a hydrogen fluoride catalyzed alkylation process have thus been found not to be analogous, in this respect, to the conditions required for successful operation of a sulfuric acid alkylation process. Significant expense and difficulty are, therefore, still encountered in commercial hydrogen fluoride catalyzed operations in attempting to provide the required external isobutane/olefin mole ratio in the hydrocarbon feed to the alkylation reactor. The required, high external isobutane/olefin mole ratio used in conventional operations necessitates throughput, separation and recycle of excessive amounts of isobutane in the conventional alkylation system. This problem is substantially alleviated by the process of the present invention.

The prior art has attempted to utilize plural alkylation reactors for a variety of reasons, but never in order to obtain a higher isoparaffin/olefin mole ratio in the feed to the alkylation reactor in the manner taught by the present invention. For example, U.S. Pat. 2,256,880 teaches the use of several reactors and settlers in a process for sulfuric acid catalyzed alkylation of isoparaffin with olefins. The settled hydrocarbon phases recovered from each reactor settler system are subjected to flash distillation between succeeding stages in order to separate isoparaffin vapor from the higher boiling alkylation reaction product, which remains liquid in the flash separation. The vaporized isoparaffin is subsequently condensed and recycled. A portion of the liquid alkylation reaction product may be passed to a succeeding stage, but at least a portion of the liquid remaining after flash distillation between stages is passed directly to fractionation in order to recover the product. Avoidance of accumulation of alkylation reaction products in the reactors and the use of extremely low isoparaffin/olefin mole ratios within the alkylation reaction zone are also taught in the above cited patent, contrary to the procedures utilized in the process of the present invention using hydrogen fluoride catalyst. U.S. Pat. No. 2,820,073 also teaches the use of plural alkylation reactors and settlers in isoparaffin-olefin alkylation, but utilizes fractionators between each succeeding stage in order to separate unreacted isoparaffin in a settled hydrocarbon phase from the alkylation reaction product in the settled hydrocarbon phase. The isoparaffin thus separated is recovered as a vapor, condensed, and passed to a succeeding stage. The reaction product is recovered. U.S. Pat. No. 3,007,983 teaches the use of two reactors and settlers in isoparaffin-olefin alkylation. The settled hydrocarbon phase recovered from each stage is subjected to flash distillation to separate the isoparaffin, as a vapor, from the higher boiling alkylation reaction product, which remains liquid. The isoparaffin vapor is condensed and passed to a succeeding stage. The alkylation reaction product is recovered as a liquid. The teachings of the last mentioned patent are directed primarily to autorefrigeration in sulfuric acid alkylation. U.S. Pat. No. 3,236,912 teaches the alkylation of isobutane with propylene and butylenes in one reactor-settler system to produce one alkylation reaction product and the alkylation of ethylene with isobutane in a second reactor-settler system to produce a second alkylation reaction product. The ethylene reactant is passed through the first reactor-settler system in admixture with propylene, butylenes and isobutane, but is not reacted in the first system. When it is desired to recover the first and second alkylation reaction products in admixture, the settled hydrocarbon phase, containing unreacted ethylene, is recovered from the first reactor-settler system and passed directly to the second reactor-settler system, where the ethylene in the settled hydrocarbon phase is reacted with isobutane. It may be possible to pass ethylene through the first reactor-settler system without alkylation reaction of the ethylene, since ethylene cannot be reacted with an isoparaffin to form an alkylation reaction product using hydrogen fluoride catalyst or sulfuric acid catalyst. Obviously, if the ethylene could react to form alkylate under conventional, propylene or butylenes alkylation conditions, ethylene would react in the first reactor-settler system. When ethylene is contacted with hydrogen fluoride catalyst at propylene-butylenes alkylation conditions, it forms stable ethyl fluoride, which is inert to alkylation reaction.

SUMMARY OF THE INVENTION

It is an object of the present invention to provide a process for alkylating isobutane with $C_3$–$C_5$ olefins utilizing hydrogen fluoride alkylation catalyst.

It is another object of the present invention to provide a hydrogen fluoride catalyzed alkylation process which produces an alkylate product having superior quality and superior utility as a motor fuel blending component.

It is a further object of the present invention to provide an economical method for increasing the external isoparaffin/olefin mole ratio in a hydrogen fluoride catalyzed isoparaffin-olefin alkylation process.

It is a further object of the present invention to provide a hydrogen fluoride catalyzed isoparaffin-olefin alkylation process which has a reduced requirement for fractionation to separate the alkylate product from unreacted isoparaffin which is to be recycled to the alkylation reactor.

In an embodiment the present invention relates to a process for producing an alkylation reaction product from an isoparaffin and a mono-olefin selected from propylene, butylenes and amylenes, which comprises the steps of: admixing a first portion of the monoolefin with the isoparaffin and contacting the resulting first hydrocarbon mixture with a first hydrogen fluoride alkylation catalyst phase in a first alkylation reaction zone at hydrogen fluoride alkylation conditions to form a first alkylation reaction mixture; removing the first alkylation reaction mixture from the first alkylation reaction zone, settling the first reaction mixture to provide a first settled hydrocarbon phase and the first hydrogen fluoride catalyst phase, and recycling the first catalyst phase to the first alkylation reaction zone; admixing a second portion of the mono-olefin with at least a portion of the first settled hydrocarbons phase and contacting the resulting second hydrocarbon mixture with a second hydrogen fluoride catalyst phase in a second alkylation reaction zone at hydrogen fluoride alkylation conditions to form a second alkylation reaction mixture; removing the second alkylation reaction mixture from the second alkylation reaction zone, settling the second reaction mixture to provide a second settled hydrocarbons phase and the second hydrogen fluoride catalyst phase and recycling the second catalyst phase to the second alkylation reaction zone; and, fractionating the second settled hydrocarbons phase to provide a higher boiling product stream and a lower boiling isoparaffin stream, recycling the isoparaffin stream to the first alkylation reaction zone and recovering the alkylation reaction product from the product stream.

Among the more important advantages of the process of this invention, relative to prior art alkylation operations, are the advantages which derive from a substantial reduction in the overall excess amount of isobutane required in relation to the amount of olefin reactant utilized in the operation. By passing all of the isobutane but only a portion of the olefin, in admixture, into a first alkylation reactor, a substantially smaller amount of isobutane is required in the first hydrogen fluoride catalyzed alkylation reaction in order to provide an adequate external molar excess of isobutane relative to the amount of olefin utilized. The settled hydrocarbon phase recovered from the first settler is then admixed with a second portion of the olefin feed to form a second hydrocarbon reactor feed, which is charged to a second alkylation reactor and contacted with a second hydrogen fluoride catalyst phase, whereby the same relatively small amount of isobutane is utilized to provide the desired external molar excess of isobutane in both the first and second hydrocarbon feeds to the respective alkylation reactors. The settled hydrocarbon phase recovered from the second settler is then fractionated to separate and recycle unreacted isobutane to the first reactor and to recover the desired alkylation reaction product. The amount of isobutane which must be thus separated by fractionation and recycled is substantially less than that found in conventional hydrogen fluoride catalyzed isobutane-olefin alkylation processes employing the same external isobutane/olefin mole ratio. Alternatively, a conventional amount of isobutane may be employed in the feed to the first alkylation reactor, giving a higher octane alkylate product than is obtained in conventional alkylation operations. By the method of the present invention, unreacted isoparaffin contained in all the settled hydrocarbon phase recovered from the first reactor-settler system is admixed with a second portion of the olefinic feed stock to provide a high external isobutane/olefin mole ratio in the hydrocarbon feed to the second alkylation reactor. This second hydrocarbon feed is then contacted with a second hydrogen fluoride catalyst phase in the second reactor. When the second portion of the olefinic feed is admixed with the first settled hydrocarbon phase externally to the second reactor and the resulting mixture of olefinic feed stock and settled hydrocarbon phase is then charged to the second reactor, the effective, external isoparaffin/olefin mole ratio is substantially increased, providing higher quality alkylate product from the second reactor. Conversely, the prior art methods, in which isobutane is employed in admixture with hydrogen fluoride catalyst as a feed to plural alkylation zones, fail to provide isobutane which acts to produce a high external isoparaffin/olefin mole ratio in the reactor feed, resulting in a low quality alkylate product.

Further objects, embodiments and advantages of the present invention will be apparent to those skilled in the art from the following description of the drawing and detailed description of the invention.

DESCRIPTION OF THE DRAWING

The attached drawing is a schematic illustration of a preferred embodiment of the process of the present invention. In the particular embodiment set forth, the alkylatable hydrocarbon is isobutane and the olefinic feed stock is a mixture of propylene and butylenes. The scope of the present invention is not limited to the embodiment shown, and various other suitable reactants and embodiments will be obvious to those skilled in the art from the description hereinafter provided.

Referring to the drawing, a conventional olefin alkylation feed stock is charged continuously through conduit 1 at a rate of about 300 moles/hour propylene and 300 moles/hour butylenes along with smaller amounts of other hydrocarbons, conventionally present in a commercial olefin feed stock but not necessary for operation of the process, including 120 moles/hour isobutane, 35 moles/hour n-butane and 70 moles/hour propane. The continuously charged olefinic feed stock in conduit 1 is divided into two streams of equal volume which are passed into conduits 2 and 3. The two portions of olefinic feed stock are passed into conduits 2 and 3, respectively, each at the rate of 150 moles/hour propylene, 150 moles/hour butylenes, 60 moles/hour isobutane, 17.5 moles/hour n-butane and 35 moles/hour propane. Conventional, externally derived, makeup isobutane is passed into the process via conduit 4, charged into conduit 2 and admixed with the portion of the olefin feed stock therein. The makeup isobutane stream is passed through conduit 4 at a rate of 500 moles/hour of isobutane, along with conventional amounts of unnecessary, non-reactive hydrocarbons including about 15 moles/hour n-butane and about 10 moles/hour propane. The admixed makeup isobutane and portion of olefin feed continue through conduit 2. Recycled isobutane from conduit 24 is passed into conduit 2 and admixed with the contents thereof. The recycle isobutane is passed into conduit 2 at the rate of 3550 moles/hour isobutane, along with some other nonreactive hydrocarbon recycle resulting from imprecise fractionation, including 525 moles/hour n-butane and 225 moles/hour propane. The total hydrocarbon charge to reactor 5 thus includes 150 moles/hour propylene, 150 moles/hour butylenes, 4110 moles/hour isobutane, with non-reactive hydrocarbons including 270 moles/hour propane and 557.5 moles/hour n-butane. The external isobutane/olefin mole ratio in the feed to reactor 5 is thus 13.7. The combined feed is passed through conduit 2 into reactor 5 and admixed with conventional hydrogen fluoride alkylation catalyst to form a reaction mixture. The hydrogen fluoride alkylation catalyst is charged to reactor 5 through conduit 10. The catalyst contains about 85 weight percent acid, less than 1 weight percent water, with the remainder made up of conventional organic diluent. Hydrogen fluoride alkylation conditions maintained in reactor 5 include a temperature of about 90°–100°F. and a pressure sufficient to maintain hydrocarbons and catalyst in the liquid phase. A catalyst/hydrocarbon volume ratio of about 1:1 to about 2:1 is utilized. Heat generated in the alkylation reaction is withdrawn by the use of indirect heat exchange in reactor 5. Cooling water is charged through conduit 6 into reactor 5 and passed in indirect heat exchange with the reaction mixture. Used cooling water is withdrawn via conduit 7. After a contact time of about 0.1 minute to about 5 minutes, reaction mixture in reactor 5 is withdrawn and passed through conduit 8 into settler 9. The reaction mixture is allowed to stand without agitation in settler 9, whereby the hydrogen fluoride catalyst forms a heavier phase and the hydrocarbon components of the reaction mixture form a lighter settled hydrocarbon phase. The catalyst phase is withdrawn from the bottom of settler 9 through conduit 10 and passed back to reactor 5 for further catalytic use. Regeneration of the catalyst used in reactor 5 may be accomplished by passing a slip stream of catalyst from conduit 10 to conventional regeneration means. Referring again to settler 9, the first settled hydrocarbon phase formed therein is withdrawn from the top of settler 9 via conduit 11, passed into conduit 3, and commingled with the remaining portion of olefin feed therein. The first settled hydrocarbon phase passed through conduit 11 includes approximately 3800 moles/hour isobutane, substantially no olefins, 557.5 moles/hour n-butane, 280 moles/hour propane and 300 moles/hour of alkylate. The combined hydrocarbon charge to reactor 12 from conduit 3 includes about 3860 moles/hour isobutane, 150 moles/hour propylene, 150 moles/hour butylenes, 575 moles/hour n-butane, 315 moles/hour propane and 300 moles/hour alkylate. The external isobutane/olefin mole ratio of the hydrocarbon charge to reactor 12 is thus about 13:1. The reaction conditions employed in reactor 12 are similar to those employed in reactor 5, i.e., a temperature of about 90°–100°F., acid/hydrocarbon volume ratio of about 1:1 to about 2:1 and a pressure sufficient to maintain the reaction mixture components in the liquid phase. Hydrogen fluoride catalyst containing about 85 weight percent acid, less than about 1 weight percent water, with the remainder made up of organic diluent, is charged to reactor 12 through conduit 19 and intimately admixed with the hydrocarbon feed from conduit 3 to form a second reaction mixture. Cooling water is charged through conduit 13 and passed in indirect heat exchange with the reaction mixture in reactor 12. Used cooling water is withdrawn through conduit 14. After a contact time of about 0.1 minute to about 5 minutes, the reaction mixture is withdrawn from reactor 12 and passed through conduit 15 into reaction soaker 16. The reaction mixture of catalyst, reactants and reaction products is maintained in reaction soaker 16 for a contact time of about 10 minutes at a temperature and pressure substantially the same as employed in reactor 12. The reaction mixture is then withdrawn and passed through conduit 17 into settler 18. The reaction mixture is allowed to stand without agitation in settler 18 to facilitate separation of the catalyst and hydrocarbons into separate phases. The heavier catalyst phase is withdrawn from the bottom of settler 18 through conduit 19 and recycled to reactor 12 for further catalytic use as described. A portion of the catalyst in conduit 19 may be passed to a convention regeneration operation if desired. The second settled hydrocarbon phase is withdrawn from settler 18 and passed through conduit 20 into isobutane stripper 21 at the rate of about 325 moles/hour propane, 3550 moles/hour isobutane, 575 moles/hour n-butane and 600 moles/hour alkylate ($C_5+$ hydrocarbons). In isobutane stripper 21, the second settled hydrocarbon phase is fractionated to separate a lighter recycle isobutane stream and a heavier, product alkylate stream. The conventional fractionation operation performed in isobutane stripper 21 may utilize conventional ancillary equipment, not shown, such as trays, reboiling means, refluxing means, etc., all known in the art. Alkylate product is removed as a bottoms product from isobutane stripper 21 through conduit 22, passed out of the operation, and recovered for motor fuel or other desired uses at the rate of 600 moles/hour. Normal butane, a by-product of the process in the embodiment shown, is withdrawn as a side cut through conduit 23 at the rate of 50 moles/hour. Conventional recycle isobutane is withdrawn as a side cut on a higher tray in isobutane stripper 21 through conduit 24. The recycle isobutane stream is passed out of isobutane stripper 21 through conduit 24 at the rate of 3320 moles/hour isobutane, 500 moles/hour n-butane and 225 moles/hour propane. The recycle isobutane stream in conduit 24 is passed into conduit 2 as described above. An overhead stream is withdrawn from isobutane stripper 21 and passed through conduit 25 into conventional depropanizer 26. The overhead stream is passed from isostripper 21 at the rate of 100 moles/hour propane, 230 moles/hour isobutane and 25 moles/hour n-butane. In depropanizer 26, the feed from conduit 25 is fractionated to separate propane from isobutane and n-butane. The isobutane and n-butane are withdrawn, at the rate of 230 moles/hour isobutane and 25 moles/hour n-butane, as a bottoms product and passed through conduit 27 into conduit 24 for use in the recycle isobutane stream. Propane, admixed with some hydrogen fluoride, is withdrawn overhead through conduit 28, at the rate of 100 moles/hour propane, and passed through conduit 28 into conduit 29 in admixture with hydrogen fluoride from conduit 36. The mixture of propane and hydrogen fluoride in conduit 29 is passed into condenser 30 and condensed to liquefy the propane and acid. The liquefied propane and hydrogen fluoride are then passed through conduit 31 into settler 32. Most of the hydrogen fluoride passed into settler 32 settles out as a heavy phase of relatively pure acid and is withdrawn through conduit 33. This relatively concentrated acid may be passed back into the recycle catalyst streams in conduit 10 and conduit 19 by conventional means not shown. The liquefied propane phase in settler 32 is withdrawn and passed through conduit 34 into hydrogen fluoride stripper 35, wherein the propane is fractionated to separate out any remaining acid. The acid is withdrawn overhead through conduit 36, passed back into conduit 29, and treated as described above. The propane is withdrawn as a by-product from the bottom of hydrogen fluoride stripper 35 through conduit 37 at the rate of 100 moles/hour. Certain conventional equipment and operations necessary for the operation of the embodiment described in the foregoing have been omitted from the drawing and description thereof, e.g., pumps, valves, reboilers, etc. The use and placement of such conventional items will be obvious to those skilled in the art. The foregoing description illustrates some of the advantages of the present invention when embodied in a hydrogen fluoride catalyzed isoparaffin-olefin alkylation process. For example, the hydrocarbons are charged to reactor 5 and reactor 12 at high external isobutane/olefin mole ratios of about 13:1, necessary in order to produce alkylate of sufficient quality. Yet fractionation requirements in isobutane stripper 21 need only be sufficient to separate isobutane equivalent to an overall isobutane/olefin mole ratio of less than 7:1. The alkylate produced is of a quality equal or superior to alkylate produced in conventional alkylation processes using a conventional 12:1 external isobutane/olefin mole ratio, while the fractionation requirements are substantially reduced, with attendant savings in capital and utilites costs. By contrast, alkylate produced in a conventional hydrogen fluoride catalyzed alkylation process using an overall isobutane/olefin mole ratio of 7:1 would be low in quality and lack utility as a blending stock to upgrade low gasoline pool components to the desired octane level.

DETAILED DESCRIPTION OF THE INVENTION

The hydrogen fluoride catalyzed alkylation process of the present invention may be applied to the alkylation of isobutane, isopentane or similar isoparaffins. The preferred isoparaffins are isobutane and isopentane, particularly isobutane. A mixture of two or more isoparaffins may also be employed, if desired. Conventional isobutane alkylation feed stocks are suitable for use in the present process. Such conventional makeup isobutane feed stocks may contain some non-reactive hydrocarbons such as normal paraffins. For example, a conventional commercial isobutane alkylation feed stock generally contains about 95 weight percent isobutane, 4 weight percent n-butane and 1 weight percent propane.

Olefins which are suitable for use in the process of the present invention include $C_3$–$C_5$ olefins. Mixtures of two or more olefin compounds may also be employed in the present process with good results. For example, conventional olefin feed stocks used in commercial olefin alkylation operations contain mixtures of propylene and butylenes, butylenes and amylenes, or propylene, butylenes and amylenes. The benefits of the present process may be obtained using such feed stocks as well as when using a single olefin. A conventional $C_3$–$C_5$ olefin alkylation feed stock, which is particularly preferred for use in this process, may be derived from petroleum refining operations such as catalytic cracking and may therefore contain substantial amounts of saturated hydrocarbons, lighter and heavier olefins, etc.

The hydrogen fluoride catalysts employed in the present process are well known in the art. Generally, hydrogen fluoride alkylation catalyst contains about 75 weight percent or more of titratable acid, about 5 weight percent or less water, with the remainder being organic diluent. Such a alkylation catalyst is suitable for use in both the first and second alkylation steps in the present process. A particularly preferred catalyst for use in both alkylation steps contains about 85 weight percent acid and less than 1 weight percent water, the remainder being organic diluent.

Numerous alkylation reaction zones suitable for use in the process of this invention are known in the art. For example, but not by way of limitation, the types of alkylation reactors described in U.S. Pat. Nos. 3,456,033, 3,469,949 and 3,501,536 may suitably be employed for both alkylation reactors in the present process. Alkylation conditions associated with the particular alkylation reactors described in the abovelisted patents or in connection with other suitable conventional alkylation reactors may be used in conjunction with the description herein in embodiments of the present invention.

Hydrogen fluoride alkylation conditions suitable for use in an embodiment of the present process include a temperature of about 0°F. to about 200°F., a pressure sufficient to maintain the reactants and the hydrogen fluoride catalyst in the liquid phase, and a contact time between the hydrocarbons and catalyst of about 0.1 minute to about 30 minutes. In a preferred embodiment utilizing a hydrogen fluoride alkylation catalyst containing about 85 weight percent acid, a catalyst/hydrocarbon volume ratio of about 1:1 to about 5:1 is preferred, and a temperature of about 50°F. to about 150°F. is preferably employed in the alkylation reaction zones.

In a particularly preferred embodiment, the reaction mixture of hydrogen fluoride catalyst, reactants and reaction products formed in the alkylation reactor is passed through a reaction soaker. In the description of the preferred embodiments herein provided, it is intended that both the alkylation reactor and a reaction soaker, if one is utilized, are included within the scope of the term "alkylation reaction zone." Suitable reaction soakers are well known in the art. For example, the reaction soakers described in U.S. Pat. Nos. 3,560,587 and 3,607,970 may suitably be employed in the present process. Such reaction soakers are conventionally vessels equipped with perforated trays, baffle sections, or the like, to maintain an alkylation reaction mixture in the form of a fairly homogeneous mixture, or emulsion, for a predetermined length of time. The alkylation reaction mixture of catalyst and hydrocarbons is maintained in the reaction soaker for a time which depends on the composition of the reaction mixture. A reaction soaker residence time of about 1 minute to about 30 minutes is preferred. The temperature and pressure maintained in the reaction soaker are the same as the temperature and pressure maintained in the associated alkylation reactor.

Means for settling the reaction mixture effluent from the alkylation reaction zone in order to separate a settled hydrocarbon phase and a hydrogen fluoride catalyst phase are well known in the alkylation art. Generally, the effluent alkylation reaction mixture recovered from an alkylation reactor or soaker comprises a mixture of unreacted isoparaffin, alkylation reaction products, hydrogen fluoride catalyst and catalyst-soluble organic materials, possibly with small amounts of light hydrocarbons, etc. When this alkylation reaction mixture is allowed to stand unstirred, i.e., settled, the alkylation reaction products, isoparaffins and light hydrocarbons form a lighter settled hydrocarbon phase. The hydrogen fluoride catalyst and catalyst-soluble hydrocarbons form a separate phase. The settled hydrocarbon phase is then simply mechanically separated from the catalyst phase. The temperature and pressure maintained during such a settling operation are substantially the same as those described above in connection with hydrogen fluoride alkylation conditions employed in a reactor.

The hydrocarbons and the catalyst are maintained in the liquid phase during the settling separation operation.

Some means for withdrawing heat from the alkylation zone is necessary for optimum operation of the process. A variety of means for accomplishing the heat withdrawal are well known. For example, in one embodiment the heat generated in the alkylation reaction may be withdrawn directly from the alkylation reactor by indirect heat exchange between cooling water and the reaction mixture in the reactor.

The settled hydrocarbon phase recovered from the first settling operation is combined with a second portion of the olefin feed in order to provide the hydrocarbon charge to the second alkylation reactor. Thus, the first settled hydrocarbon phase is utilized to provide a high external isobutane/olefin mole ratio in the feed to the second alkylation reactor. The hydrocarbon feed formed from the first settled hydrocarbon phase and the second portion of olefinic reactant is then charged to the second alkylation reactor and contacted with a second hydrogen fluoride alkylation catalyst therein. It is contemplated that sufficient isobutane is charged to the first alkylation reactor that no further extraneous isobutane need be added to the admixed second portion of olefinic feed and first settled hydrocarbon phase prior to charging this hydrocarbon admixture to the second alkylation reactor. The same general alkylation conditions are used in the second alkylation step as are used in the first alkylation step. Although a reaction soaker may be utilized in connection with both the first and the second alkylation reactors, in a preferred embodiment a reaction soaker is employed only in connection with the second alkylation reactor. The temperature and pressure used in the reaction soaker are the same as those employed in the associated reactor. After completion of the reaction of all olefins charged to the second alkylation reaction zone, the resulting reaction mixture is settled by any suitable, conventional method to provide a second settled hydrocarbon phase and to recover the second hydrogen fluoride catalyst phase for recycle to the second alkylation reaction zone. The second settled hydrocarbon phase is recovered from the second settling operation and is passed to a conventional isobutane stripping fractionation operation, whereby the heavier alkylate product is separated from the lower boiling, unconsumed isobutane and from any hydrogen fluoride which may be present in the second settled hydrocarbon phase. Any suitable method utilized in the prior art to fractionate the settled hydrocarbon phase recovered from a settler may be employed to separate the higher boiling alkylate product from the lower boiling isobutane recycle stream.

The alkylation reaction product produced in the preferred embodiment of the present process will generally comprise $C_7$–$C_9$ saturated hydrocarbons resulting from the alkylation reactions of isobutane with the olefins in both the first and second alkylation zones. The primary components of the product include, for example, dimethylpentanes and trimethylpentanes. It is well known that more highly branched hydrocarbons generally possess superior properties as motor fuel. The present invention is directed, in part, to providing motor fuel alkylate containing a higher ratio of more highly branched hydrocarbons, such as trimethylpentanes, to less branched hydrocarbons, such as dimethylhexanes. This benefit is obtained by the use, in the present process, of high external isobutane/olefin mole ratios in both alkylation reactions, unattainable in prior art process on a generally economical or operative basis. Thus, it is apparent that the present invention provides a novel process for producing a superior motor fuel alkylate product by a method more economical and convenient than has been available in prior art hydrogen fluoride catalyzed alkylation processes.

In general, the benefits and advantages of the present process are provided when at least two different portions of the olefin reactant feed stock and at least two different hydrogen fluoride catalysts in at least two different alkylation zones are employed. One suitable modification of the present process is to divide the olefin feed stock into a plurality of portions, e.g., three or more. The total isobutane feed and a first portion of the olefin feed stock are admixed and then contacted with a first hydrogen fluoride catalyst in a first alkylation zone, the catalyst and hydrocarbons are settled and separated, and the first settled hydrocarbon phase and a second portion of the olefin feed stock are admixed and then contacted with a second hydrogen fluoride catalyst in a second alkylation zone. The second settled hydrocarbon phase recovered by settling the resulting mixture is admixed with a third portion of the olefin feed stock and the resulting hydrocarbon mixture is contacted with a third hydrogen fluoride catalyst in a third alkylation zone, etc., without addition of further isobutane between stages. The settled hydrocarbon phase recovered from the last alkylation zone in the series is fractionated to recover the alkylation reaction product and separate unreacted isobutane for recycle to the first alkylation zone. Such a modification is within the scope of the present invention.

Where it is desired to employ two alkylation zones and to divide the olefin feed stock into two portions, as in the preferred embodiment, it is preferred that the two portions of olefinic feed be such that neither portion contains less than about 10 volume percent of the total amount of olefin used in the process. For example, in a continuous operation, the first portion of olefin may be fed to the first alkylation zone at a rate of 10 moles/hour along with an amount of isobutane sufficient to provide the desired molar excess thereof in the first reactor at hydrogen fluoride alkylation conditions. The second portion of olefin is preferably admixed with the first settled hydrocarbon phase to be charged to the second alkylation reaction zone at a rate of at least about 1 mole/hour and not more than about 100 moles/hour. Preferably the two portions of olefin feed stock do not vary in the relative amounts of olefin they contain by more than about 1:5 to about 5:1, by volume. Best results are achieved in a two-reactor system, as described in the preferred embodiments, when the two portions of olefin feed stock contain roughly equal amounts of the olefinic feed stock. In this way, the amount of isobutane needed to provide a high external isobutane/olefin mole ratio in the hydrocarbon feed to each alkylation reactor is kept to a minimum, while the highest quality alkylate product possible can thereby be obtained from both the first and the second reactors.

EXAMPLE

In order to demonstrate the benefits and advantages of the present invention in contrast to prior art alkylation methods, two runs, one using the method of the present invention and the other using a conventional alkylation procedure, were performed. The olefin feed stock employed in both runs contained 48 weight percent propylene, 10.4 weight percent butene-1 26 weight percent butene-2 and 15.6 weight percent isobutylene. Isobutane was employed as the isoparaffin feed stock. In Run 1, the method of the present invention, using two stages of alkylation, was utilized, and in Run 2, the conventional, single-stage method was utilized. In both Run 1 and Run 2 the same temperature, pressure and catalysts were utilized. The hydrogen fluoride catalyst utilized contained 89 weight percent hydrogen fluoride, 10 weight percent organic diluent and 1 weight percent water. The temperature utilized for the alkylation reactions was about 99°F. The pressure employed was sufficient to maintain the reactants and catalyst as liquids. In each run the hydrocarbon feed and catalyst were continuously charged to a conventional, bench-scale alkylation reactor at a catalyst/hydrocarbon weight ratio of about 1.5:1, and a 10 minute residence time in the alkylation reactor was maintained in each run. In Run 1, using the method of the present invention, the olefin feed stock was split into two portions. The total isoparaffin feed stock and a first portion of the olefin feed stock were admixed and the resulting hydrocarbon feed was charged to a conventional alkylation reactor and contacted with hydrogen fluoride catalyst therein at the above described conditions to form a first reaction mixture. After the specified residence time, the first reaction mixture was withdrawn and conventionally settled to separate a first settled hydrocarbon phase from a settled catalyst phase. The resulting first settled hydrocarbon phase and the second portion of the olefin feed stock were continuously charged to a conventional alkylation reactor and contacted with hydrogen fluoride catalyst therein at the above described alkylation conditions to form a second reaction mixture. No additional isobutane was added to the second reaction mixture, the isobutane contained in the first settled hydrocarbon phase being the sole supply of isobutane in the second reaction mixture. After the specified residence time, the second reaction mixture was withdrawn and conventionally settled to separate a second settled hydrocarbon phase from a settled catalyst phase. The second settled hydrocarbon phase was recovered, fractionated to separate out $C_5$ and heavier hydrocarbons and the $C_5+$ hydrocarbons were recovered as the alkylate product of Run 1. The alkylate product of Run 1 was analyzed and the results are set forth in the Table. In Run 2, using a conventional one-stage alkylation procedure, the whole olefin feed stock was continuously charged to a conventional alkylation reactor at a rate equal to the combined feed rate of the first and second portions of olefin feed stock in Run 1. In Run 2, the total isobutane feed stock was continuously charged to the alkylation reactor at the same rate as was used in Run 1. The olefin feed stock and isobutane feed stock were admixed and the resulting hydrocarbon mixture was charged to the alkylation reactor and contacted therein with hydrogen fluoride catalyst at the above-described alkylation conditions to form a reaction mixture. After the 10 minute residence time, the reaction mixture was withdrawn from the reactor and conventionally settled to separate a settled catalyst phase from a settled hydrocarbon phase. The settled hydrocarbon phase was recovered, fractionated to separate out $C_5$ and heavier hydrocarbons, and the $C_5+$ hydrocarbons were recovered as the alkylate product of Run 2. The alkylate product of Run 2 was analyzed and the results are set forth in the Table.

TABLE

| Alkylate Product Analysis | Run I | Run II |
|---|---|---|
| $C_8$ Hydrocarbons, wt. % | 61.5 | 56.1 |
| $C_9+$ Hydrocarbons, wt. % | 6.1 | 9.6 |
| Trimethylpentanes, wt. % | 56.3 | 50.4 |
| Dimethylhexanes, wt. % | 5.15 | 5.8 |
| Research Octane Number (Clear) | 95.2 | 94.5 |
| Motor Octane Number (Clear) | 92.4 | 92.1 |

Referring to the Table, it is apparent that the process of the present invention (Run 1) provided a superior alkylate product relative to conventional alkylation procedures (Run 2). Yet, no additional isobutane was employed in Run 1 and the required fractionation to separate the $C_5+$ alkylate hydrocarbons was identical in Run 1 and Run 2. The figures shown in the Table demonstrate that the process of the present invention produces an alkylate product having higher octane ratings with reduced amounts of undesirable heavy ends ($C_9+$ hydrocarbons).

I claim as my invention:

1. A process for alkylating an isoparaffin with a mono-olefin of from 3 to 5 carbon atoms per molecule, which comprises the steps of:
   a. contacting said isoparaffin with a first portion of said mono-olefin in admixture with a first hydrogen fluoride catalyst in a first alkylation zone at alkylation conditions;
   b. separating the resultant reaction mixture into a catalyst phase and a hydrocarbon phase containing isoparaffin-olefin alkylate and unreacted isoparaffin, and recycling separated catalyst phase to said first zone;
   c. admixing a second portion of said mono-olefin with said hydrocarbon phase from step (b) containing alkylate and unreacted isoparaffin and subjecting the resultant mixture to alkylation conditions in contact with a second hydrogen fluoride catalyst in a second alkylation zone;
   d. separating the effluent of said second zone into a second hydrocarbon phase and a second catalyst phase and recycling said second catalyst phase to said second zone;
   e. fractionating said second hydrocarbon phase to separate therefrom a lower boiling isoparaffin fraction and a higher boiling alkylate product; and
   f. recycling said isoparaffin fraction to said first zone and recovering said alkylate product.

2. The process of claim 1 wherein said isoparaffin is isobutane.

3. The process of claim 1 wherein said mono-olefin is selected from butene-1, butene-2 and isobutylene.

4. The process of claim 1 wherein said first portion of said mono-olefin comprises from about 10 mole percent to about 1000 mole percent of said second portion of said mono-olefin.

* * * * *